United States Patent
Chesney et al.

(10) Patent No.: US 11,053,908 B2
(45) Date of Patent: Jul. 6, 2021

(54) DEVICE AND METHOD FOR DETECTING A CYLINDER DEACTIVATION MODE USING INFERRED COMPRESSION

(71) Applicant: Ford Motor Company, Dearborn, MI (US)

(72) Inventors: David J. Chesney, Northville, MI (US); Roderick Alexander Simpson, Windsor (CA)

(73) Assignee: Ford Motor Company, Dearborn, MI (US)

( * ) Notice: Subject to any disclaimer, the term of this patent is extended or adjusted under 35 U.S.C. 154(b) by 424 days.

(21) Appl. No.: 15/984,691

(22) Filed: May 21, 2018

(65) Prior Publication Data

US 2019/0353135 A1    Nov. 21, 2019

(51) Int. Cl.
| | |
|---|---|
| F02P 17/12 | (2006.01) |
| G01M 15/04 | (2006.01) |
| F02D 13/06 | (2006.01) |
| F02D 17/02 | (2006.01) |
| F02D 41/00 | (2006.01) |

(52) U.S. Cl.
CPC ............. *F02P 17/12* (2013.01); *F02D 13/06* (2013.01); *F02D 17/02* (2013.01); *F02D 41/0087* (2013.01); *G01M 15/042* (2013.01); *F02P 2017/121* (2013.01)

(58) Field of Classification Search
CPC ..... F02P 17/12; F02P 2017/121; F02D 13/06; F02D 17/02; F02D 41/0087; G01M 15/042
See application file for complete search history.

(56) References Cited

U.S. PATENT DOCUMENTS

| | | | | |
|---|---|---|---|---|
| 3,955,135 A | * | 5/1976 | Fastaia ................... | F02P 17/06 324/384 |
| 3,961,239 A | * | 6/1976 | Lach ...................... | F02P 17/06 324/384 |
| 3,979,598 A | * | 9/1976 | Lach ...................... | F02P 17/06 327/276 |
| 5,138,874 A | | 8/1992 | Davis | |

(Continued)

FOREIGN PATENT DOCUMENTS

EP    0814257    12/1997

OTHER PUBLICATIONS

Choosing the Right Pressure Sensors for Engine Test, available at URL https://measurementsensors.honeywell.com/techresources/appnotes/Pages/choosing_pressure_sensors.aspx.

(Continued)

*Primary Examiner* — David Hamaoui
*Assistant Examiner* — John D Bailey
(74) *Attorney, Agent, or Firm* — Burris Law, PLLC (57) ABSTRACT

A method of verifying a cylinder deactivation mode on an engine is provided. The method can include activating an ignition device in a deactivated cylinder during an exhaust stroke of the deactivated cylinder. The method can include measuring a voltage of the ignition device. The method can include comparing at least one of an amplitude and a timing of a measured spike of the voltage against a baseline voltage spike. The method can include indicating a status of the deactivation mode based on the comparison against the baseline voltage spike.

20 Claims, 3 Drawing Sheets

(56) References Cited

U.S. PATENT DOCUMENTS

| | | | | |
|---|---|---|---|---|
| 5,207,200 | A * | 5/1993 | Iwata | F02D 41/22 |
| | | | | 123/406.14 |
| 5,396,176 | A * | 3/1995 | Ishii | F02P 17/12 |
| | | | | 123/479 |
| 5,417,109 | A * | 5/1995 | Scourtes | G01M 15/09 |
| | | | | 73/114.01 |
| 5,492,006 | A | 2/1996 | Beckett | |
| 5,780,730 | A | 7/1998 | Scourtes et al. | |
| 6,463,795 | B2 | 10/2002 | Kosmehl et al. | |
| 7,314,034 | B1 | 1/2008 | Waters et al. | |
| 7,762,237 | B2 | 7/2010 | Gibson et al. | |
| 7,900,509 | B2 | 3/2011 | Feldkamp et al. | |
| 8,117,904 | B2 | 2/2012 | Chesney et al. | |
| 8,375,920 | B2 | 2/2013 | Tsukamoto et al. | |
| 9,562,470 | B2 | 2/2017 | Younkins et al. | |
| 2003/0079528 | A1 * | 5/2003 | Wittliff | G01M 15/044 |
| | | | | 73/114.11 |
| 2003/0230074 | A1 * | 12/2003 | Huang | F02D 41/1458 |
| | | | | 60/285 |
| 2007/0114901 | A1 * | 5/2007 | Nagasawa | H01T 13/50 |
| | | | | 313/141 |
| 2007/0215102 | A1 * | 9/2007 | Russell | F02D 41/0025 |
| | | | | 123/310 |
| 2007/0215104 | A1 * | 9/2007 | Hahn | F02D 35/027 |
| | | | | 123/339.11 |
| 2007/0215130 | A1 * | 9/2007 | Shelby | F02D 19/084 |
| | | | | 123/637 |
| 2009/0066337 | A1 * | 3/2009 | Gibson | G01M 15/042 |
| | | | | 324/378 |
| 2010/0242583 | A1 | 9/2010 | Chesney et al. | |
| 2011/0094475 | A1 * | 4/2011 | Riegel | F02P 3/0456 |
| | | | | 123/406.23 |
| 2016/0116371 | A1 | 4/2016 | Chen et al. | |
| 2017/0101956 | A1 * | 4/2017 | Younkins | F02D 13/06 |

OTHER PUBLICATIONS

Khurana, A., Pervading Cold Testing of Engines in the Automobile Zone, Applied Mechanics and Materials, vols. 1100-116, pp. 4544-4548, 2012, Trans Tech Publications, Switzerland. Available at URL http://citeseerx.ist.psu.edu/viewdoc/download?doi=10.1.1.1017.3641&rep=rep1&type=pdf.

* cited by examiner

DEVICE AND METHOD FOR DETECTING A CYLINDER DEACTIVATION MODE USING INFERRED COMPRESSION

FIELD

The present disclosure relates to a device and method for detecting a cylinder deactivation mode using inferred compression.

BACKGROUND

The statements in this section merely provide background information related to the present disclosure and may not constitute prior art.

Some piston-cylinder internal combustion engines, commonly called variable displacement engines, can be operated in a cylinder deactivation mode in which one or more of the cylinders are selectively deactivated. Fuel is typically not provided to the deactivated cylinders. Accordingly, the deactivation of one or more cylinders during situations when less power is required can improve overall fuel efficiency of the vehicle. The deactivated cylinders can then be reactivated when more power is required. In some variable displacement engines, it can be advantageous to have the intake and exhaust valves of the deactivated cylinders remain closed during all strokes of deactivated cylinder until that cylinder is reactivated.

It can be advantageous to test the operation of the engine before installation on the rest of the vehicle, and in a cold state (i.e., without combustion occurring in the engine). However, it can be difficult to accurately test the operation of the deactivation mode in the cold state without modifying the engine or involving additional sensors that must be removed before assembling the engine in the finished vehicle.

These issues with cold testing the deactivated cylinder mode of variable displacement engines without using additional sensors are addressed with the teachings of the present disclosure.

SUMMARY

In one form, a method of verifying a cylinder deactivation mode on an engine. The method includes activating an ignition device in a deactivated cylinder during an exhaust stroke of the deactivated cylinder. The method includes measuring a voltage of the ignition device. The method includes comparing at least one of an amplitude and a timing of a measured spike of the voltage against a baseline voltage spike. The method includes indicating a status of the deactivation mode based on the comparison against the baseline voltage spike.

According to a further form, a revolution per minute (RPM) of the engine is less than 1,000 RPM.

According to a further form, the method is carried out without combustion within the engine.

According to a further form, the deactivated cylinder includes a plurality of intake and exhaust valves. The intake and exhaust valves of the deactivated cylinder are configured to remain closed during the exhaust stroke of the deactivated cylinder.

According to a further form, proper operation of the cylinder deactivation mode is indicated without the use of a pressure sensor.

According to a further form, the method includes sequentially activating a plurality of ignition devices in subsequent deactivated cylinders to determine proper operation of the cylinder deactivation mode for each of the subsequent deactivated cylinders.

According to a further form, the cylinder deactivation mode is indicated as defective when the amplitude of the measured spike is outside of a tolerance of an amplitude of the baseline voltage spike, or the measured spike occurs earlier in time than the baseline voltage spike.

According to a further form, the deactivated cylinder comprises two intake valves and two exhaust valves.

According to a further form, the ignition device is a spark plug.

In another form, a method of verifying a mode of an engine without combustion taking place in the engine includes rotating a crankshaft of the engine. The method includes activating a cylinder deactivation mode of the engine. The method includes activating an ignition device in a deactivated cylinder during an engine exhaust stroke. The method includes measuring a voltage signal of the ignition device. The method includes comparing the voltage signal against a baseline. The method includes indicating a status of the cylinder deactivation mode based on the comparison against the baseline.

According to a further form, the method includes sequentially activating a plurality of ignition devices in subsequent deactivated cylinders to determine proper operation of the cylinder deactivation mode for each of the subsequent deactivated cylinders.

According to a further form, the cylinder deactivation mode is indicated as defective when at least one of an amplitude of a spike of the measured voltage signal is less than an amplitude of a spike of the baseline, and the spike of the measured voltage signal occurs earlier in time than the spike of the baseline.

According to a further form, the method is carried out without the use of a pressure sensor.

According to a further form, the ignition device is a spark plug.

In another form, a method of inferring compression within a cylinder of an engine without using a pressure sensor includes activating a sparkplug in a cylinder during an exhaust stroke. The method includes measuring a voltage of the sparkplug. The method includes comparing at least one of an amplitude and a timing of a measured spike of the voltage against a baseline voltage spike. The method includes indicating a status of compression in the cylinder based on the comparison against the baseline voltage spike.

According to a further form, the cylinder is a deactivated cylinder during a deactivation mode of the engine, and the status is indicated as proper operation of the deactivation mode when the amplitude and timing of the measured spike are within predetermined tolerances of the baseline voltage spike.

According to a further form, the cylinder is a deactivated cylinder during a deactivation mode of the engine, and the status is indicated as defective operation of the deactivation mode when the amplitude of the measured spike is outside predetermined tolerances relative to an amplitude of the baseline voltage spike, or the timing of the measured spike is outside predetermined tolerances relative to a timing of the baseline voltage spike.

According to a further form, a revolutions per minute (RPM) of the engine is less than 1,000 RPM and the method is carried out without combustion within the engine.

According to a further form, the method includes sequentially activating a plurality of ignition devices in subsequent deactivated cylinders to determine proper compression for each of the subsequent deactivated cylinders.

According to a further form, the cylinder comprises a plurality of intake and exhaust valves and the method further includes maintaining the intake and exhaust valves of the cylinder closed during the exhaust stroke of the cylinder.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
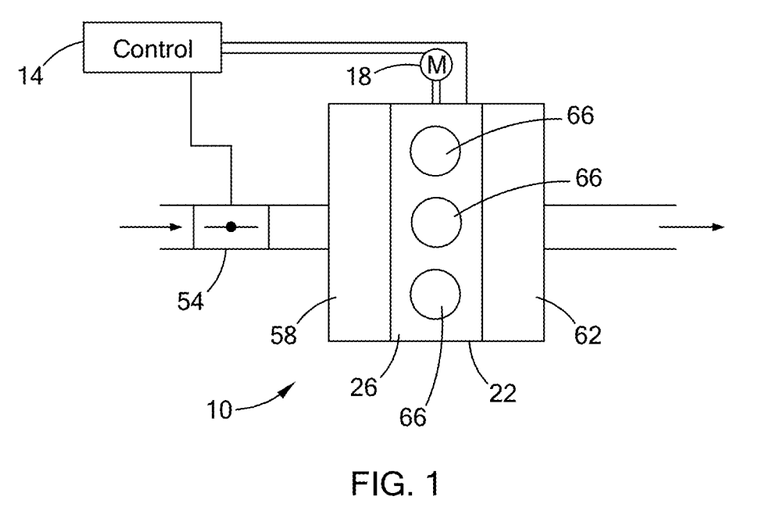
FIG. 1 is a schematic view of an internal combustion engine and a test apparatus in accordance with the teachings of the present disclosure, illustrating the engine having a plurality of combustion cylinders.
Figure 2:
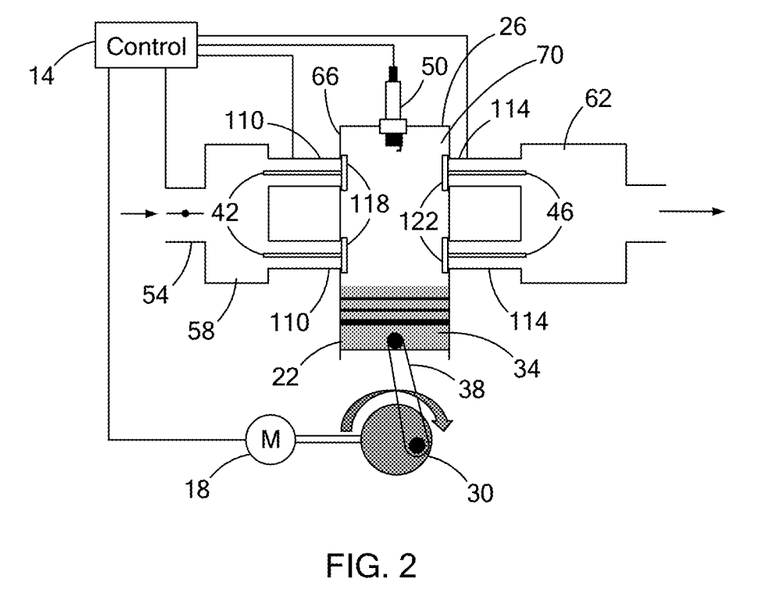
FIG. 2 is a schematic view of a portion of the internal combustion engine and test apparatus of FIG. 1, illustrating one of the combustion cylinders of the engine of FIG. 1.

With reference to FIGS. 1 and 2, an engine 10 is illustrated connected to a test apparatus that includes a control module 14 and a motor 18. The engine 10 includes an engine block 22, a cylinder head 26, a crankshaft 30, a plurality of pistons 34, a plurality of connecting rods 38, a plurality of intake valves 42, a plurality of exhaust valves 46, a plurality of ignition devices 50, a throttle body 54, an intake manifold 58, and an exhaust manifold 62.

In the example provided, the engine block 22 and cylinder head 26 are configured as an engine with three cylinders 66 in an inline configuration, though other numbers of cylinders and configurations can be used (e.g., I-4, V-6, V-8, W-12, flat-4, etc.). Each piston 34 is slidable within a corresponding one of the cylinders 66 so that the piston 34, engine block 22, and cylinder head 26 define a combustion chamber 70. Each piston 34 is coupled to the crankshaft 30 by a corresponding connecting rod 38 in a conventional manner. The crankshaft 30 is rotatably coupled to the engine block 22 and configured so that rotation of the crankshaft 30 relative to the engine block 22 translates the pistons 34 in the cylinders 66 to change the volume of the combustion chamber 70. In the example provided, the engine 10 is a four-stroke engine 10 such that during normal operation of the engine 10, each piston 34 moves through an intake stroke, a compression stroke, a power or combustion stroke, and an exhaust stroke.

The throttle body 54 is connected to the intake manifold 58 and configured to adjust an air flow into the intake manifold 58. In the example provided, the throttle body 54 is a butterfly style throttle body including a throttle plate movable within a housing to adjust airflow through the housing, though other configurations can be used. The throttle body 54 is illustrated in FIG. 2 with the throttle plate in a wide-open position, or full throttle position, in which maximum air-flow is permitted through the throttle body 54. In the example provided, the throttle body 54 is an electrically controlled throttle body, such that the position of the throttle plate is controlled by the control module 14.

The intake manifold 58 is connected to the throttle body 54 and the cylinder head 26 for fluid communication therewith. The intake manifold 58 is configured to receive airflow from the throttle body 54 and to distribute air to each combustion chamber 70 via the intake valves 42. The exhaust manifold 62 is connected to the cylinder head 26 for fluid communication therewith. The exhaust manifold 62 is configured to receive combustion gasses from the combustion chambers 70 and exhaust the combustion gasses from the engine 10.

In the example provided, the cylinder head 26 defines a pair of intake valve apertures 110 and a pair of exhaust valve apertures 114 for each combustion chamber 70, though other numbers of intake and exhaust apertures per combustion chamber 70 can be used. Each intake valve 42 corresponds to one of the intake apertures 110. Each intake valve 42 is operable in an open state, in which a valve member 118 of the intake valve 42 permits airflow from the intake manifold 58 into the combustion chamber 70, and a closed state, in which the valve member 118 inhibits airflow from the intake manifold 58 to the combustion chamber 70. Each exhaust valve 46 corresponds to one of the exhaust apertures 114. Each exhaust valve 46 is operable in an open state, in which a valve member 122 of the exhaust valve 46 permits airflow from the combustion chamber 70 to the exhaust manifold 62, and a closed state in which the valve member 122 inhibits airflow from the combustion chamber 70 to the exhaust manifold 62.

In the example provided, the intake valves 42 and exhaust valves 46 are changed from their open to closed state by camshafts (not shown), though other configurations can be used (e.g., solenoid actuated valves). In the example provided, the camshafts (not shown) are drivingly coupled to the crankshaft 30 so that rotation of the crankshaft 30 can cause rotation of the camshafts (not shown). The camshafts (not shown have cam surfaces or lobes that engage deactivatable roller finger followers (not shown) that are configured to move the valve members 118, 122 relative to the cylinder head 26. In the example provided, the followers (not shown) are configured to be selectively operated in a first state wherein the follower can move the corresponding valve member 118 or 122, and in a second state wherein the follower does not move the corresponding valve member 118 or 122.

During normal engine operation, the intake valves 42 for a particular cylinder 66 are generally open during the intake stroke of that cylinder 66, but are generally closed during the compression, power, and exhaust strokes. During normal engine operation, fuel is injected by a fuel injector (not shown) into the cylinders during the intake stroke and/or the compression stroke. During normal engine operation, the exhaust valves 46 for a particular cylinder 66 are generally open during the exhaust stroke, but are generally closed during the intake, compression, and power strokes. It is understood that the timings of the opening and closing of the intake valves 42 and exhaust valves 46 described herein is only referring to the general nature of their opening or closing for a particular stroke of the engine, and does not mean that the intake valves 42 need to be open during the entire intake stroke, or closed during the entire exhaust or compression stroke, nor does it mean that the exhaust valves 46 need to be closed during the entire intake or power stroke, or open during the entire exhaust stroke. It is also understood that the timing of the opening and closing of the valves 42, 46 can be controlled and changed by the control module 14 or a variable valve timing system (not shown).

In order to reduce fuel consumption, the engine 10 is configured to be selectively operated in a cylinder deactivation mode, such that at least one cylinder 66 is deactivated to not produce power, while the other, active cylinders 66 operate as normal to continue to produce power. In the example provided, the engine is configured so that a predetermined set one of the three cylinders 66 can be deactivated. In other configurations, not shown, the cylinder 66 that is deactivated can change (e.g., the different cylinders 66 can take turns being deactivated). In other configurations, not shown, more than one cylinder can be deactivated (e.g., two or more cylinders of a V8 engine can be deactivated).

During the cylinder deactivation mode, the intake valves 42 and exhaust valves 46 of the deactivated cylinder 66 are deactivated by the control module 14 so that they remain closed during all strokes for that cylinder until the cylinder is reactivated. In the example provided, when deactivation of the cylinder 66 is desired, the followers (not shown) for the intake valves 42 and the exhaust valves 46 no longer transmit motion from the cams (not shown) to the valve members 118, 122 of that deactivated cylinder 66. The intake valves 42 and exhaust valves 46 are normally closed valves, such that the lack of actuation from the cams (not shown) results in the intake and exhaust valves 42, 46 for the deactivated cylinder remaining closed during deactivation mode.

Each ignition device 50 is mounted to the cylinder head 26 so that an ignition portion of the ignition device is positioned to cause ignition of compressed air-fuel mixture in the combustion chamber 70. In the example provided, the ignition device 50 is a spark plug having an electrode and a ground strap spaced apart from the electrode to form a spark plug gap. The spark plug ignition device 50 is configured to produce a spark between the electrode and the ground strap within the combustion chamber 70 when power is supplied to the electrode at a predetermined voltage across the spark plug gap.

During normal engine operation, the ignition device 50 is configured to produce the spark near the end of the compression stroke (e.g., near or at top-dead-center) to ignite the compressed air-fuel mixture in the combustion chamber 70. During normal engine operation, the ignition device 50 does not create a spark during other strokes of the engine such as the exhaust stroke.

The motor 18 is an electric motor drivingly connected to the crankshaft 30 so that activation of the motor 18 rotates the crankshaft 30 to translate the pistons 34 in the cylinders 66.

The control module 14 is configured to control operation of the throttle body 54, the motor 18, the ignition devices 50, the intake valves 42, and the exhaust valves 46. The control module 14 is configured to cold test the operation of the deactivation mode. In other words, the control module 14 is configured to ensure that the deactivation mode is properly functioning without combustion occurring in the engine 10.

Figure 3:
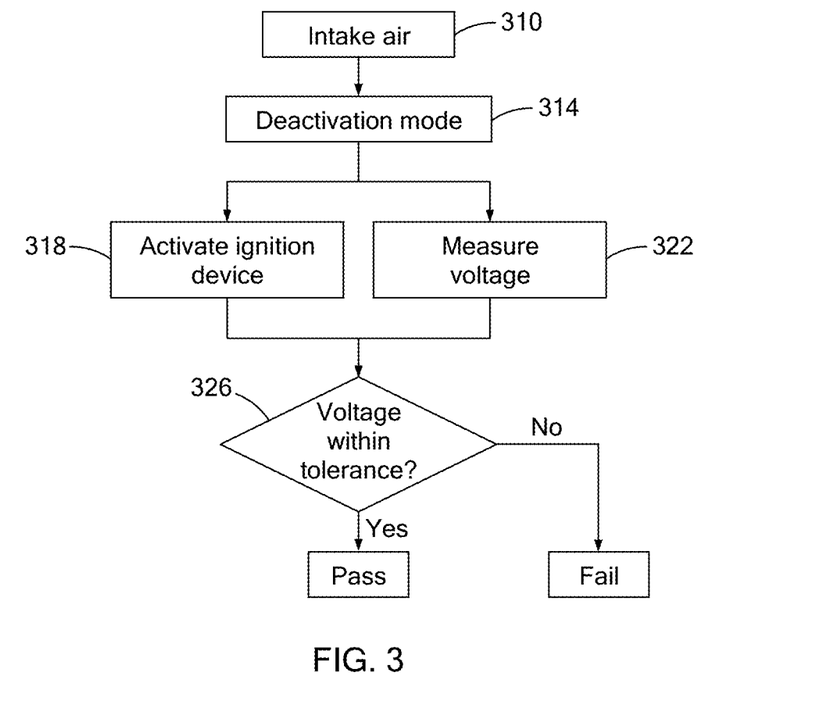
FIG. 3 is a flow chart of a method of testing a deactivation mode of the engine of FIGS. 1 and 2.

With continued reference to FIG. 2 and additional reference to FIG. 3, a method of testing the deactivation mode of the engine 10 is illustrated in flow chart form. At step 310, the combustion chamber 70 of a cylinder to be tested is filled with air. In the example provided, the control module 14 activates the motor 18 to rotate the crankshaft 30 since the engine is not supplied with fuel and no combustion takes place in any of the cylinders during the test. In the example provided, the crankshaft 30 is rotated at a relatively low rotational speed (e.g., less than 1,000 RPM), though other configurations can be used, such as speeds greater than 1,000 RPM. When deactivation of a particular cylinder 66 is to be tested, the control module 14 allows the valves 42, 46 to operate normally for an intake stroke of that cylinder 66 to be tested, so that the piston 34 draws air into the combustion chamber 70, (e.g., the throttle body 54 and the intake valves 42 are open but the exhaust valves 46 are closed while the combustion chamber 70 expands). In the example provided, the cylinder deactivation mode is implemented based on a specific crank angle that corresponds to the exhaust valves 46 being closed before the intake valve to ensure a trapped air charge condition occurs. In the example provided, the throttle body 54 is fully opened to permit a large charge of air to be drawn into the combustion chamber 70, though other throttle positions can be used. Once air is in the combustion chamber 70, the method proceeds to step 314.

At step 314, the control module 14 then enables a cylinder deactivation mode of the engine 10 in which the control module 14 deactivates the cylinder 66 so that all of the intake and exhaust valves 42, 46 for the deactivated cylinder 66 remain closed throughout all strokes until such time that it is removed from the deactivation mode (i.e., the cylinder 66 is reactivated). Since the motor is rotating the crankshaft 30, the pistons 34 continue to move through the cylinders 66 in accordance with the four strokes and the cams (not shown) continue to open or close the valves 42, 46 of the cylinders 66 that are not deactivated. After entering the deactivation mode, the method proceeds to step 318 and step 322.

At step 318, the control module 14 activates the ignition device 50 of the deactivated cylinder 66 while the air in the deactivated cylinder 66 is compressed during the exhaust stroke. In other words, the control module 14 provides electrical power to the ignition device 50 of the deactivated cylinder 66 until electricity arcs across the spark plug gap. During normal engine operation, the exhaust valves 46 would be open during the exhaust stroke and pressure within the cylinder would be relatively low, but since the engine is operating in a cylinder deactivation mode, the exhaust valves 46 of the deactivated cylinder 66 should be closed and the air within the deactivated cylinder 66 should be compressed. If the deactivation mode is not operating correctly, such as if one of the valves 42, 46 or followers (not shown) are stuck open, air will leak through the open valve 42, 46 and the pressure of the air within the deactivated cylinder 66 will be less than expected.

At step 322, the control module 14 measures the magnitude and timing of the voltage of the ignition device 50 of the deactivated cylinder 66. The voltage is measured while the ignition device 50 is activated during step 318. In the example provided, the voltage is measured on the primary side supply voltage of the ignition coil (not shown) of the engine 10, though other configurations can be used. After the voltage is measured, the method can proceed to step 326.

At step 326, the control module 14 compares the voltage that was measured with values of a baseline voltage magnitude and time. This baseline voltage is predetermined and can be stored within memory on the control module or external to the control module 14 and accessed by the control module 14. With additional reference to FIG. 4, a graph of voltage over time is illustrated. Line 410 illustrates the baseline voltage signal. The baseline voltage signal 410 is the expected voltage for the ignition device 50 activated in step 318 when the valves 42, 46 of the deactivated cylinder 66 are closed during the exhaust stroke (i.e., during a properly functioning deactivated mode in which the air charge in the cylinder is in a compression condition on the exhaust stroke). Line 414 illustrates an example voltage signal where one or more of the valves 42, 46 are open during the exhaust stroke, causing air leakage from the combustion chamber 70, which can be indicative of a problem with the deactivation mode. In both the baseline signal 410 and the example signal 414 provided in FIG. 4, the power is provided to the ignition device 50 at time $t_1$. Since the voltage is measured at the primary side supply voltage of the engine ignition coil (not shown) in the example provided, the time $t_1$ is the time when the ignition coil primary current is interrupted (e.g., the end of ignition dwell) and the measured power signal is a generally decaying sine wave shaped signal as a result of a $2^{nd}$ order RLC circuit (not specifically shown) resonance. A peak or spike 418 of the baseline signal 410 occurs at $t_3$ and indicates when the arc forms across the spark plug gap when in the cylinder deactivation mode under the compression condition on the exhaust stroke. In the example signal 414, a peak or spike 422 occurs at time $t_2$, which is after time $t_1$ and before time $t_3$, and indicates when the arc forms across the spark plug gap during an improperly functioning deactivation mode (e.g., a non-compression or improper-compression condition in which one or more of the valves 42, 46 is open, indicative of the cylinder deactivation not functioning properly).

Figure 4:
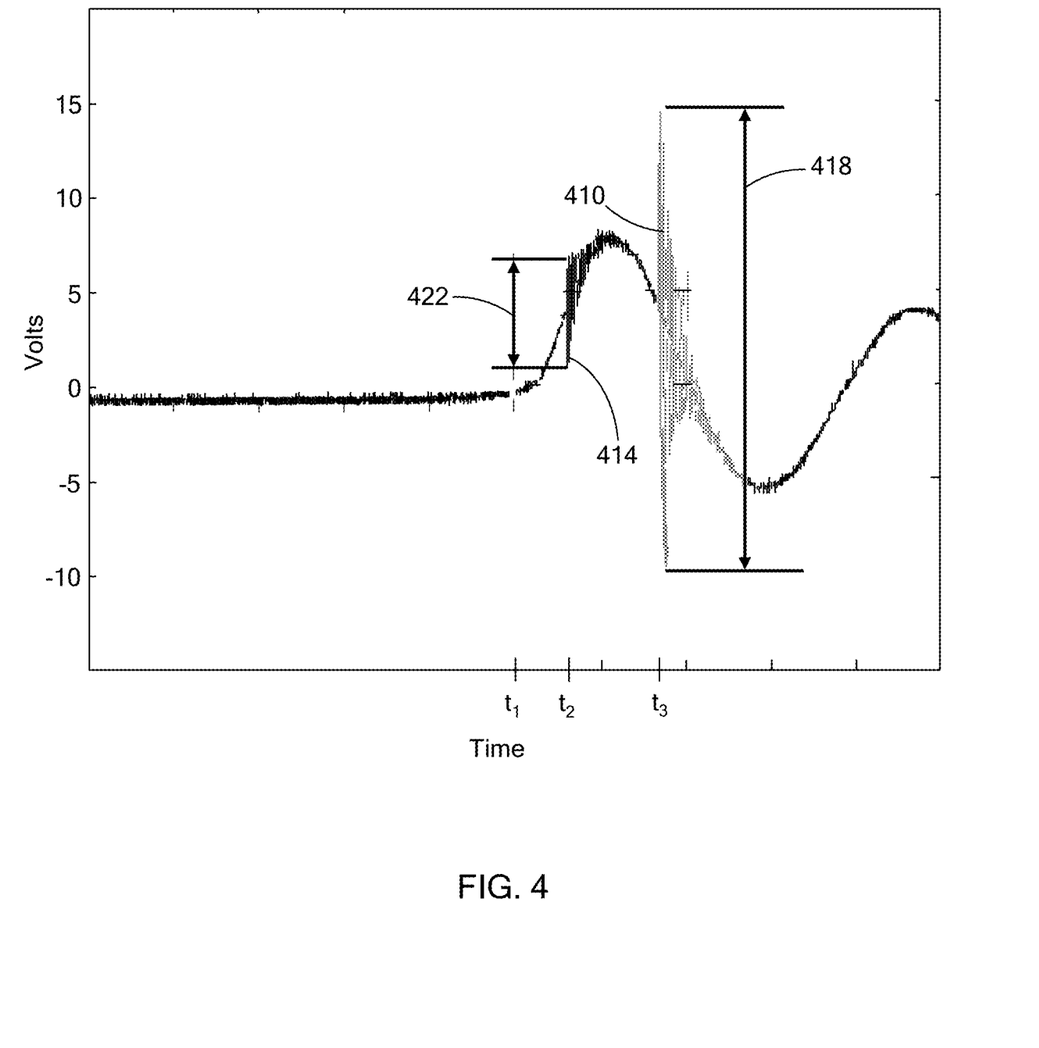
FIG. 4 is a graph of ignition voltage of a spark plug of the deactivated combustion cylinder of FIG. 3.

The signal voltage can generally have a low frequency component and a high frequency component as is described in U.S. Pat. No. 8,117,904, incorporated herein by reference. In the example provided, the spike 418 or 422 is a high frequency burst component in the voltage having both peak amplitude and timing information related to the arc forming across the gap of the spark plug 50. The magnitude of the spike 418 or 422 is its respective maximum positive and negative deviation for a given time from the base sine wave signal. The magnitude of spike 422 is less than the magnitude of the baseline spike 418 and the spike 422 occurs sooner than the baseline spike 418. In the example provided, the base sine wave signal has a max voltage of approximately 10 volts and a minimum voltage of approximately −5 volts. In the example provided, the spike 418 has a maximum voltage of approximately 15 volts, a minimum voltage of approximately −10 volts, and $t_3$ occurs approximately 0.8 microseconds after $t_1$. In the example provided, the voltage of the base sine wave signal is approximately 5 volts at $t_3$. In the example provided, the spike 422 has a maximum voltage of approximately 7.5 volts, a minimum voltage of approximately 2.5 volts, and $t_2$ occurs approximately 0.25 microseconds after $t_1$. In the example provided, the voltage of the base sine wave signal is approximately 5 volts. The example voltages and timings (e.g., $t_1$, $t_2$, $t_3$) described herein are provided as examples based on one configuration of the ignition device 50, control module 14, and the RLC circuit (not shown), and other voltages and/or timings can occur as a result of other configurations.

At step 326, the control module 14 determines if the measured voltage signal is within permitted tolerances of the baseline signal 410. If the measured voltage signal is within permitted tolerances, the control module 14 can determine that the deactivation mode is operating properly. If the measured voltage signal is not within permitted tolerances, the control module 14 can determine that the deactivation mode is not operating properly. The control module 14 can determine that the deactivation mode is not operating properly if the measured voltage spike is smaller than the baseline spike 418. Alternatively, or additionally the control module 14 can determine that the deactivation mode is not operating properly if the measured voltage spike occurs sooner than the baseline spike 418.

The timing and magnitude of the voltage spike depends on the compression of the air within the deactivated cylinder's combustion chamber 70. In the example provided, if one or more of the valves 42, 46 is open or leaking during the exhaust stroke of the deactivated cylinder 66, then the pressure in the combustion chamber 70 will be lower and the measured spike will be lower in magnitude and will occur sooner in time than when the cylinder 66 is properly deactivated.

The control module 14 can be configured to output a signal indicative of the result of the test. In other words, the control module 14 can output whether the engine 10 is properly operating in a deactivated cylinder mode or not. The output can be any suitable output that can be observed such as an indicator light, or an output on a display. The output can also be recorded or saved on memory either on the control module or external to the control module 14.

Thus, the method of the present disclosure utilizes operation of the spark plug 50 to infer compression within the combustion chamber 70 to determine if the cylinder that has been deactivated can maintain pressure during the exhaust stroke. Accordingly, the device and method of the present disclosure can determine if the deactivated mode is properly functioning (including both the intake valves 42 and the exhaust valves 46 properly deactivating) without additional pressure sensors.

The description of the disclosure is merely exemplary in nature and, thus, variations that do not depart from the substance of the disclosure are intended to be within the scope of the disclosure. Such variations are not to be regarded as a departure from the spirit and scope of the disclosure.

In this application, including the definitions below, the term "module" or the term "controller" may be replaced with the term "circuit". The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskel, Go, SQL, R, Lisp, Java®, Fortran, Perl, Pascal, Curl, OCaml, Javascript®, HTML5, Ada, Asp (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for", or in the case of a method claim using the phrases "operation for" or "step for".

What is claimed is:

1. A method of verifying a cylinder deactivation mode on an engine comprising:
    activating an ignition device in a deactivated cylinder during an exhaust stroke of the deactivated cylinder;
    measuring a primary side supply voltage of the ignition device;
    comparing at least one of an amplitude and a timing of a measured spike of the primary side supply voltage against a baseline voltage spike; and
    indicating a status of the deactivation mode based on the comparison against the baseline voltage spike.

2. The method according to claim 1, wherein a revolution per minute (RPM) of the engine is less than 1,000 RPM.

3. The method according to claim 1, wherein the method is carried out without combustion within the engine.

4. The method according to claim 1, wherein the deactivated cylinder comprises a plurality of intake and exhaust valves, the intake and exhaust valves of the deactivated cylinder being configured to remain closed during the exhaust stroke of the deactivated cylinder.

5. The method according to claim 1, further comprising sequentially activating a plurality of ignition devices in subsequent deactivated cylinders to determine proper operation of the cylinder deactivation mode for each of the subsequent deactivated cylinders.

6. The method according to claim 1, wherein the cylinder deactivation mode is indicated as defective when the amplitude of the measured spike is outside of a tolerance of an amplitude of the baseline voltage spike, or the measured spike occurs earlier in time than the baseline voltage spike.

7. The method according to claim 1, wherein the ignition device is a spark plug.

8. A method of verifying a mode of an engine without combustion taking place in the engine comprising:
    rotating a crankshaft of the engine by operating an electric motor drivingly coupled to the crankshaft;
    activating a cylinder deactivation mode of the engine;
    activating an ignition device in a deactivated cylinder during an engine exhaust stroke while rotating the crankshaft by operating the electric motor;
    measuring a voltage signal of the ignition device;
    comparing the voltage signal against a baseline; and
    indicating a status of the cylinder deactivation mode based on the comparison against the baseline.

9. The method according to claim 8, further comprising sequentially activating a plurality of ignition devices in subsequent deactivated cylinders to determine proper operation of the cylinder deactivation mode for each of the subsequent deactivated cylinders.

10. The method according to claim 8, wherein the cylinder deactivation mode is indicated as defective when at least one of an amplitude of a spike of the measured voltage signal is less than an amplitude of a spike of the baseline, and the spike of the measured voltage signal occurs earlier in time than the spike of the baseline.

11. The method according to claim 8, wherein the ignition device is a spark plug.

12. A method of inferring compression within a cylinder of an engine without using a pressure sensor comprising:
    activating a sparkplug in a cylinder during an exhaust stroke;

measuring a voltage corresponding to the activation of the sparkplug; and comparing at least one of:
an amplitude of a measured spike of a measured primary side supply voltage against an amplitude of a baseline voltage spike, and
a timing of the measured spike relative to an end of dwell of the activation of the sparkplug against a timing of the baseline voltage spike relative to a baseline end of dwell; and indicating a status of compression in the cylinder based on the comparison against the baseline voltage spike.

13. The method according to claim 12, wherein the cylinder is a deactivated cylinder during a deactivation mode of the engine, and wherein the status is indicated as proper operation of the deactivation mode when the amplitude and timing of the measured spike are within predetermined tolerances of the baseline voltage spike.

14. The method according to claim 12, wherein the cylinder is a deactivated cylinder during a deactivation mode of the engine, and wherein the status is indicated as defective operation of the deactivation mode when the amplitude of the measured spike is outside predetermined tolerances relative to an amplitude of the baseline voltage spike, or the timing of the measured spike is outside predetermined tolerances relative to a timing of the baseline voltage spike.

15. The method according to claim 12, further comprising sequentially activating a plurality of ignition devices in subsequent deactivated cylinders to determine proper compression for each of the subsequent deactivated cylinders.

16. The method according to claim 12, wherein the cylinder comprises a plurality of intake and exhaust valves, the method further comprising maintaining the intake and exhaust valves of the cylinder closed during the exhaust stroke of the cylinder.

17. The method according to claim 1, wherein the cylinder deactivation mode is indicated as defective when:
the amplitude of the measured spike of the primary side supply voltage is less than an amplitude of the baseline voltage spike,
the measured spike of the primary side supply voltage occurs earlier in time than the baseline voltage spike, or
the amplitude of the measured spike of the primary side supply voltage is less than the amplitude of the baseline voltage spike and the measured spike of the primary side supply voltage occurs earlier in time than the baseline voltage spike.

18. The method according to claim 1, wherein the cylinder deactivation mode is indicated as defective when a time between end of ignition dwell for the activating of the ignition device and the measured spike of the primary side supply voltage is less than a baseline time between end of ignition dwell and the baseline voltage spike.

19. The method according to claim 8, wherein the cylinder deactivation mode is indicated as defective when:
a time between end of ignition dwell for the activating of the ignition device and a measured spike of the measured voltage signal is less than a baseline time between end of ignition dwell and a voltage spike of the baseline,
an amplitude of the measured spike is less than an amplitude of the voltage spike of the baseline, or
the time between end of ignition dwell for the activating of the ignition device and the measured spike of the measured voltage signal is less than the baseline time between end of ignition dwell and the voltage spike of the baseline and the amplitude of the measured spike is less than the amplitude of the voltage spike of the baseline.

20. The method according to claim 12 further comprising setting a throttle body of the engine to a wide-open throttle position and rotating a crankshaft of the engine via an electric motor.

* * * * *